United States Patent
Haber et al.

Patent Number: 5,553,122
Date of Patent: Sep. 3, 1996

[54] UNIVERSAL WEDGE-TYPE TELEPHONE ADAPTOR FOR COMPUTER SYSTEM

[75] Inventors: Alan P. Haber; Simon M. Kahn, both of Jerusalem, Israel

[73] Assignee: ITI Innovative Technology Ltd., Jerusalem, Israel

[21] Appl. No.: 187,522

[22] Filed: Jan. 28, 1994

[51] Int. Cl.⁶ ................................................ H04M 11/00
[52] U.S. Cl. ........................ 379/90; 341/22; 364/705.05
[58] Field of Search ............................... 379/90, 96–98, 379/100, 110, 369, 440–442, 447; 341/22, 34; 345/168, 169; 364/705.05, 705.01, 709.01

[56] References Cited

U.S. PATENT DOCUMENTS

| | | | |
|---|---|---|---|
| 4,675,653 | 6/1987 | Priestley | 379/369 |
| 5,351,296 | 9/1994 | Sullivan | 379/97 |
| 5,375,165 | 12/1994 | Haber et al. | 379/90 |

FOREIGN PATENT DOCUMENTS 2193419  2/1988  United Kingdom.

OTHER PUBLICATIONS

W. H. Sahm, "General Electric Opto Electronics Manual", ©1976, pp. 70–73.

Primary Examiner—Wing F. Chan
Attorney, Agent, or Firm—Edward Langer

[57] ABSTRACT

A device for terminating a telephone line and connecting a telephone handset/headset thereto under control of a computer system having a keyboard and a computer, without requiring keyboard replacement or hardware modification inside the computer. The device is connected between a computer and a standard keyboard, enabling the integration of a telephone with a computer system. The device reads the scan codes which are transmitted on the keyboard bus and used by the computer to pass information from the keyboard to the computer I/O port. A keyboard controller in the keyboard provides primary control of the keyboard bus. The device recognizes scan codes which are dedicated to it, and would not otherwise be recognized by the keyboard controller. Thus, the standard keyboard ignores these scan codes, while the device will interpret them as commands to operate telephone functions. These functions include line access and dialing, automatic redial, answering incoming calls, hanging up the line, and monitoring line status. By use of the device, the user can control the foregoing telephone operations via the computer using software designed for this purpose, so that automatic control of telephone functions is possible, to increase overall efficiency. A principal advantage of the device is that it can be used without hardware modification of the computer system, by connection external to the computer, between the computer and the keyboard. Thus, a user can easily complete the connections to integrate the telephone and computer system.

20 Claims, 4 Drawing Sheets

UNIVERSAL WEDGE-TYPE TELEPHONE ADAPTOR FOR COMPUTER SYSTEM

FIELD OF THE INVENTION

The present invention relates to telephones and computer systems and interface equipment for connecting them, and more particularly, to a telephone adaptor connected between a computer and keyboard to enable the computer or keyboard to control telephone dialing and operating functions.

BACKGROUND OF THE INVENTION

The personal computer has become the engine of efficiency in the office environment, enabling a wide range of functions to be more easily achieved, including word processing, report generation, calendar date reminders, customer billing and other important organizational functions. The office environment also depends heavily on the telephone for communications, and typically the telephone and computer, while being located in the same environment, are not integrated and provide stand-alone, separate functions. Thus, the computer keyboard numeric keypad, which could be used for dialing telephone numbers, is not arranged for such an application.

Attempts have been made at electronically integrating the telephone and keyboard functions, and one example of the prior art in this area is disclosed in U.S. Pat. No. 4,860,342 to Danner. The computer serves as an interface between a keyboard and a telephone controller, and the telephone controller can be activated by depression of a designated keyboard key. Control is then switched from the application routine running on the computer, and the telephone controller establishes a telephone connection. After this, the keyboard inputs are interpreted by the computer as normal telephone dialing commands, rather than as inputs or instructions to the existing application routine. Once the telephone dialing commands have been entered, program control returns to the previously running application routine.

Another prior art reference is provided in the article entitled "Meridian M4020: Integrated terminal for today and tomorrow", authored by G. Grantham and published in Telesis, Vol. 2, 1985. The M4020 terminal is a workstation incorporating a telephone and a keyboard, and the telephone functions are handled by a remotely located host processor which receives messages via a local area network (LAN) link. Once the host has established the telephone connection, it sends a message to an internal card in the terminal to turn on the telephone speaker/microphone.

As can be seen from a review of the prior art, previous attempts at effecting communication between the telephone and the keyboard were achieved using the computer which is interposed between them. Thus, the computer must be provided with hardware to enable it to establish the connection to the telephone lines, and since this hardware is not included in a standard personal computer, a modification is needed. While such hardware modifications can be achieved by the insertion of plug-in printed circuit boards in the computer, often the user is reluctant to perform such modifications, since not all users possess the requisite familiarity with the computer.

Another approach to providing a telephone-computer interface has been demonstrated by a product commercially sold and available from owners of the present invention, Integrated Technology, Inc., Teaneck, N.J., under the tradename Compuphone, which incorporates telephone capabilities in a specially-designed keyboard. Although the computer hardware needs no modification, this product requires replacing the existing keyboard, and therefore involves an additional upgrade cost factor for existing computer systems.

Thus, it would be desirable to provide an external telephone adaptor enabling connection of a telephone to a computer system, for computer control of telephone functions.

SUMMARY OF THE INVENTION

Accordingly, it is a principal object of the present invention to overcome the above-mentioned disadvantages of the prior art and provide a universal telephone adaptor which enables connection of a telephone to a computer system without requiring keyboard replacement or hardware modification inside the computer.

In accordance with a preferred embodiment of the invention, there Is provided a universal telephone adaptor device for terminating a telephone line and connecting a telephone handset/headset thereto under control of a computer system having a keyboard and a computer, said device comprising:

a telephone controller means, coupled to the telephone line, the telephone handset/headset and a keyboard bus connecting the keyboard and computer, said telephone controller means being responsive to unique scan codes generated by the computer and transmitted on said keyboard bus for controlling the telephone line and telephone handset/headset interconnection.

In the preferred embodiment, the inventive adaptor device is provided as a "wedge" device, i.e., a device which is connected between a computer and a standard keyboard, enabling the integration of a telephone with a computer system. The adaptor device reads the scan codes which are transmitted on the keyboard bus and used by the computer to pass information to the keyboard and used by the keyboard to pass information to the computer, via its I/O port. A keyboard controller in the keyboard provides primary control of the keyboard bus.

The inventive adaptor device recognizes scan codes which are dedicated to it, and would not otherwise be recognized by the keyboard controller. Thus, the standard keyboard ignores these scan codes, while the inventive adaptor will interpret them as commands to operate telephone functions. These functions include line access and dialing, automatic redial, answering incoming calls, hanging up the line, and monitoring line status.

By use of the inventive adaptor device, the user can control the foregoing telephone operations via the computer using software designed for this purpose, so that automatic control of telephone functions is possible, to increase overall efficiency.

A principal advantage of the inventive adaptor device is that it can be used without hardware modification of the computer system, by connection external to the computer, between the computer and the keyboard. Thus, a user can easily complete the connections to integrate the telephone and computer system.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF A PREFERRED EMBODIMENT

Figure 1:
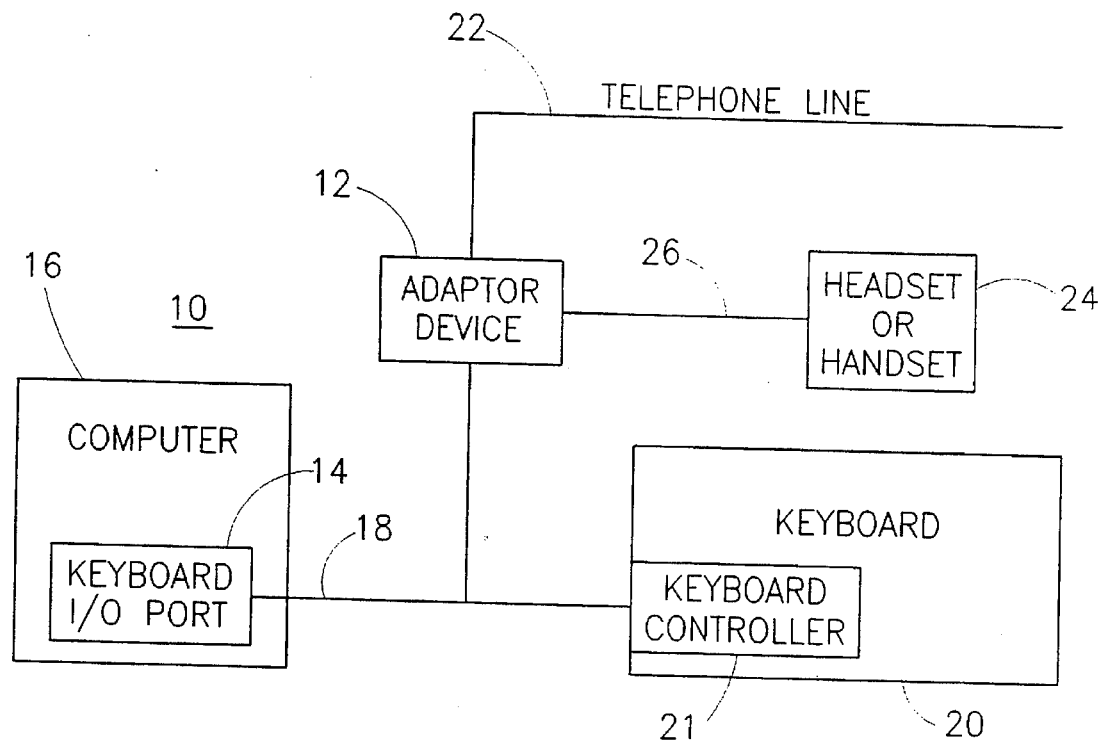
FIG. 1 is a schematic block diagram of a computer system incorporating a preferred embodiment of a universal telephone adaptor device constructed and operated in accordance with the principles of the present invention.

Referring now to FIG. 1, there is shown a schematic block diagram of a computer system 10 incorporating a telephone adaptor device 12 constructed and operated in accordance with the principles of the present invention. A keyboard I/O port 14 in computer 16 is connected via a keyboard bus 18 directly to the standard keyboard 20 having a keyboard. Adaptor device 12 is connected to keyboard bus 18 and is also connected to a telephone line 22 as well as to a standard telephone handset or headset 24 using a standard cord connector 26.

As shown, adaptor device 12 is connected external to computer 16 and keyboard 20, simplifying its installation in computer system 10 by a user. Unlike prior art internal plug-in computer cards for telephone functions, the external connection is an important feature where computer users do not possess the requisite expertise to undertake computer hardware modifications. This is defined as a wedge device, placed between keyboard 20 and keyboard I/O port 14 to allow information transfer to and from keyboard I/O port 14, device 12, or keyboard 20.

Figure 2:
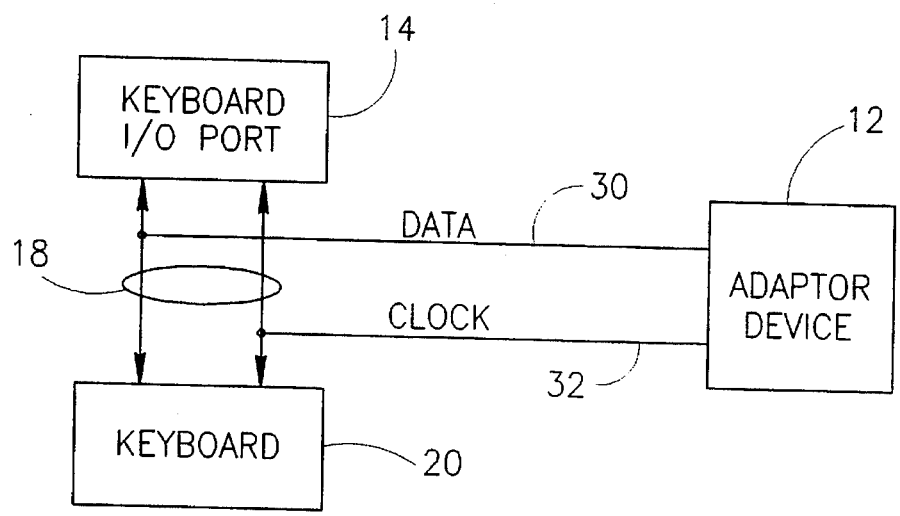
FIG. 2 is a schematic block diagram of the adaptor device of FIG. 1, shown in a parallel connection with a keyboard bus.

Referring now to FIG. 2, adaptor device 12 is shown in a parallel connection with keyboard bus 8 via two functional connections in addition to power and ground connections which are not shown. The keyboard I/O port 14 is connected to keyboard 20 via a data line 30 and a clock line 32. Clock line 32 clocks in the data being sent In either direction, to keyboard 20 from the computer system 10 or to the system 10 from keyboard 20. Adaptor device 12 receives both the data and clock lines 30 and 32, and generally listens passively to this bus. It can, however, when and if necessary, send information to computer 16 by initiating its own data transmission onto this bus.

Figure 4:
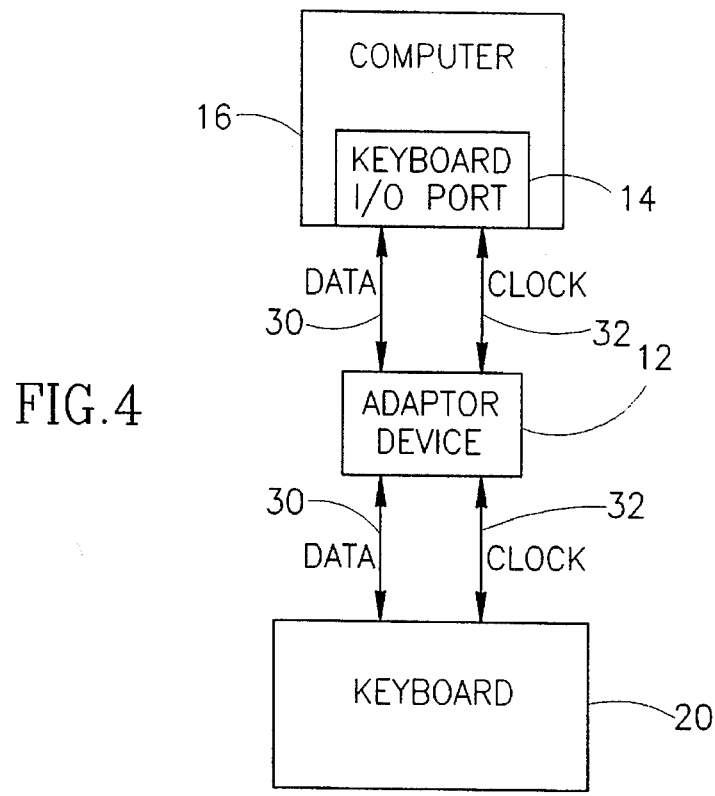
FIG. 4 is a schematic block diagram of an alternative arrangement of the adaptor device shown in a series connection with the keyboard bus.

In a variation provided in FIG. 4, another way of achieving the keyboard bus 18 monitoring function, is to actually intercept all the commands, by providing device 12 in a series connection between computer 16 and keyboard 20, to block data and clock lines 30 and 32 from computer 6 to keyboard 20. Thus, device 12 acts as a buffer, receiving information from keyboard 20, and holding it for transfer to computer 16.

Adaptor device 12 can interrupt the communications on keyboard bus 18, by monitoring the bus and determining there is a period when no communications are active, and requesting access to keyboard bus 18. Computer 16 will interpret any scan codes now received just as if they were being sent by keyboard 20. The adaptor device 12 monitoring function is integrated with the standard protocol normally used between keyboard 20 and computer 16.

Referring back to FIG. 3, a schematic block diagram of adaptor device 12 is shown, based on the configuration of FIG. 2. Adaptor device 12 can be implemented in accordance with FIG. 3 using skill of the art electronic design techniques applied to achieve the functions described. Device 12 comprises a microcontroller 34, a line status decoder 36, a caller ID decoder 37, a DTMF (Dual Tone Multi-Frequency) tone generator 38, a latch relay 40, a speech network chip 42, and a ringer 44. Device 12 receives the data and clock lines 30 and 32, and feeds them directly to microcontroller 34, such as an Intel 8051 or equivalent microcontroller. Microcontroller 34 operates device 12 and gives it the full functionality of an intelligent telephone.

DTMF tone generator 38 is connected to microcontroller 34, allowing microcontroller 34 to control generation of the tones necessary for dialing. In addition, attached to it is latch relay 40, which allows microcontroller 34 to pick up the phone, essentially, take the phone off-hook, or hang up the phone, i.e. put it back on-hook. An optional second latch relay 40 may be provided for use with an additional telephone line, if desired.

Another function which may exist in various implementations involves an emergency switch 41 in parallel to latch relay 40 to allow a user to hang up a call should there be a power outage. Thus, after making a completed call, the user is able to hang up the telephone even in the absence of power.

Also connected to microcontroller 34 is speech network chip 42, such as a Motorola MC34014 or equivalent. Speech network chip 42 allows communication between telephone handset/headset 24 and the outside world using telephone line 22. Microcontroller 34 uses speech network chip to provide a mute function, disabling handset/headset 24 microphone when desired.

In addition, connected to microcontroller 34 is line status decoder 36, such as a Philips NE5900 or equivalent. Line status decoder 36 reads the status of telephone line 22 and provides microcontroller 34 with status information, e.g., whether line 22 is busy, a dial tone is present, a ringing signal is being received, or any one of a number of related functions. This information can be used either for automatic redial functions, or to Inform computer 6 that call completion was successful or unsuccessful. Where the telephone system is equipped for caller identification on incoming telephone calls, caller ID decoder unit 37 can provide caller ID information.

Also connected to microcontroller 34 is ringer 44 such as Motorola MC 34017 or equivalent, which enables adaptor device 12 via a piezoelectric transducer 45 to provide an audible ringing signal for an incoming call, as for a standard telephone.

Figure 3:
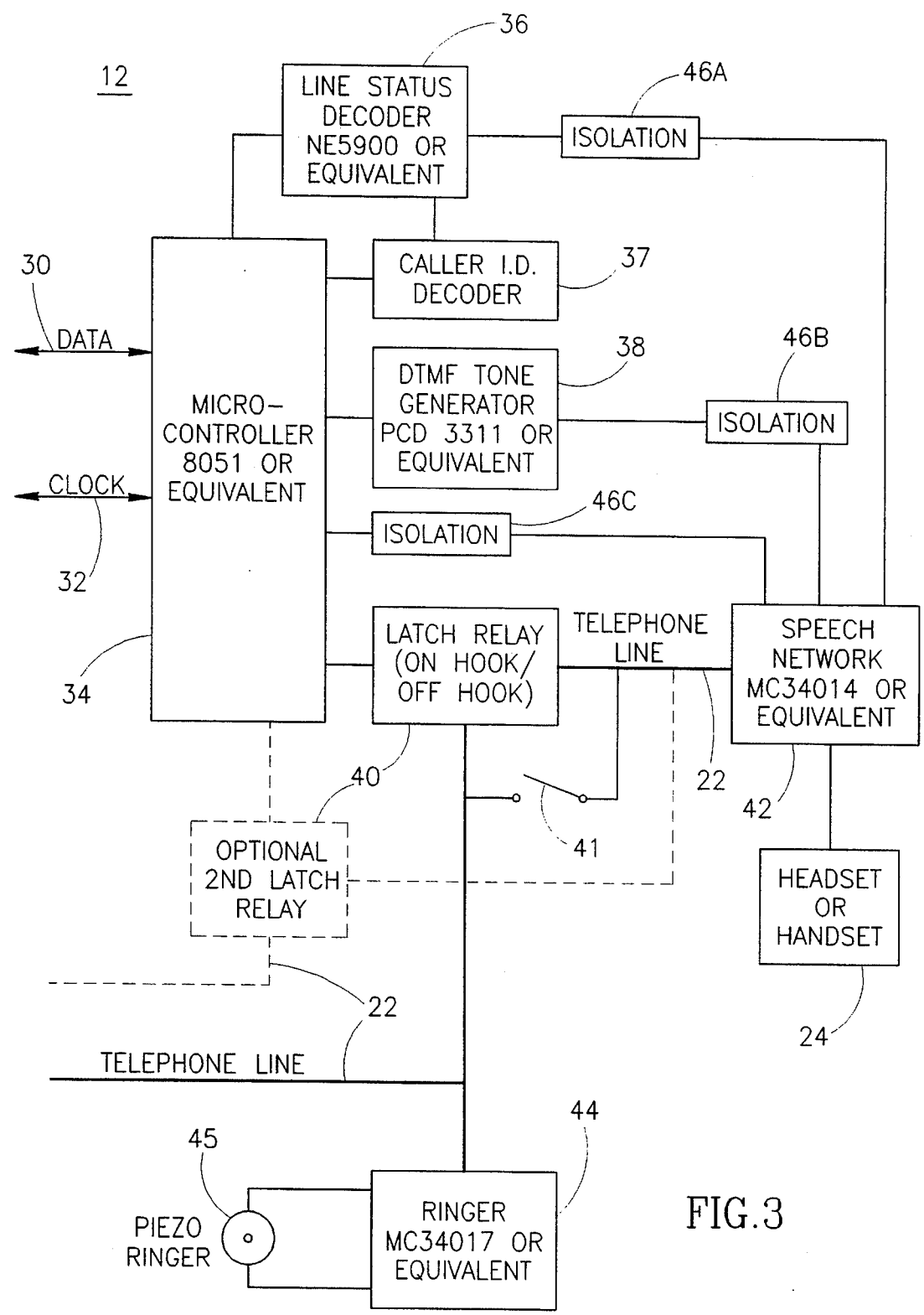
FIG. 3 is a schematic block diagram of a microcontroller-based embodiment of the device of FIGS. 1–2.

The hardware functional blocks in device 12 each incorporate an isolation device 46a–c such as an opto-isolator, or isolation transformer since telephone line 22 must be isolated from computer 16, as required by telephone standards. Therefore, as shown in FIG. 3, DTMF tone generator 38 receives information from microcontroller 34, and this tone is sent through isolation device 46b to speech network chip 42. Line status decoder 36 is isolated from network chip 42 via isolation device 46a. Microcontroller 34 is connected to speech network chip 42 via isolation device 46c. Latch relay 40 itself provides isolation of microcontroller 34 from line 22, and speech network chip 42 is directly connected to telephone line 22. Ringer 44 is directly connected on telephone line 22.

In operation, the microcontroller 34 provides a scan code interpreter which reads the scan codes on keyboard bus 18 to determine if a scan code is present which is dedicated to a performance of a telephone function. The telephone functions are provided primarily through a software program which is loaded into computer 16. The software generally operates using a set of user-defined "hot keys", which are unique keystrokes active in any software program to enable the user to immediately access the telephone, even while executing an application program. Thus, the user can answer the telephone, or hang up the phone, put the call on mute or hold, do automatic redials, dial a list of telephone numbers, or provide any of the normal functions of an intelligent telephone. An additional feature is the ability to set a predetermined delay for later dialing of a telephone number.

Still another feature which can be provided is the use of the standard keyboard as a direct dialing mechanism for telephone line 22. This is accomplished by having software in computer 16 download a command to microcontroller 34 of adaptor device 12 which instructs it to monitor keyboard bus 18 and interpret each number sent from keyboard 20 as a number for dialing purposes. Then, as the user depresses numeric keys, adaptor device 12 automatically dials until it receives an end command, which will instruct it to stop interpreting the numbers received on the keyboard bus 18 from keyboard 20 as telephone dialing commands. In this direct dialing mode, the software can show the numbers being dialed on the computer display monitor.

Figure 5:
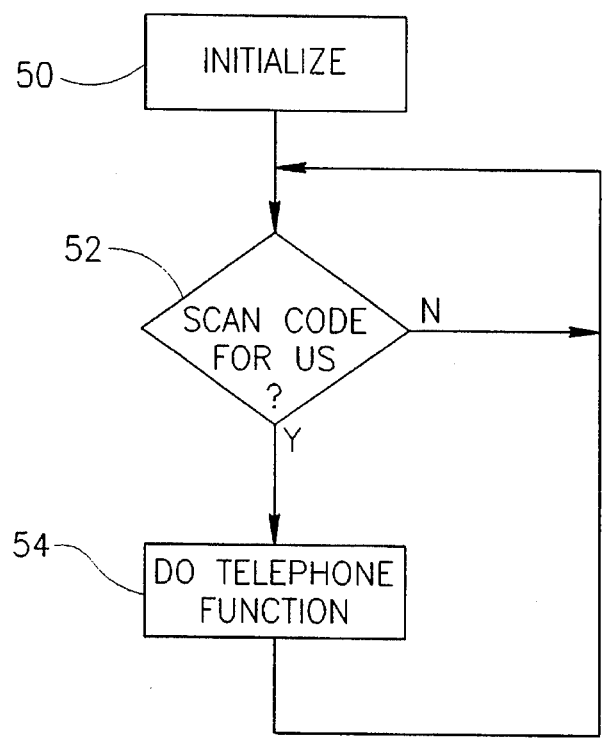
FIGS. 5–6 are flowcharts of the operational sequence of the telephone adaptor device in accordance with the invention.
Figure 6:
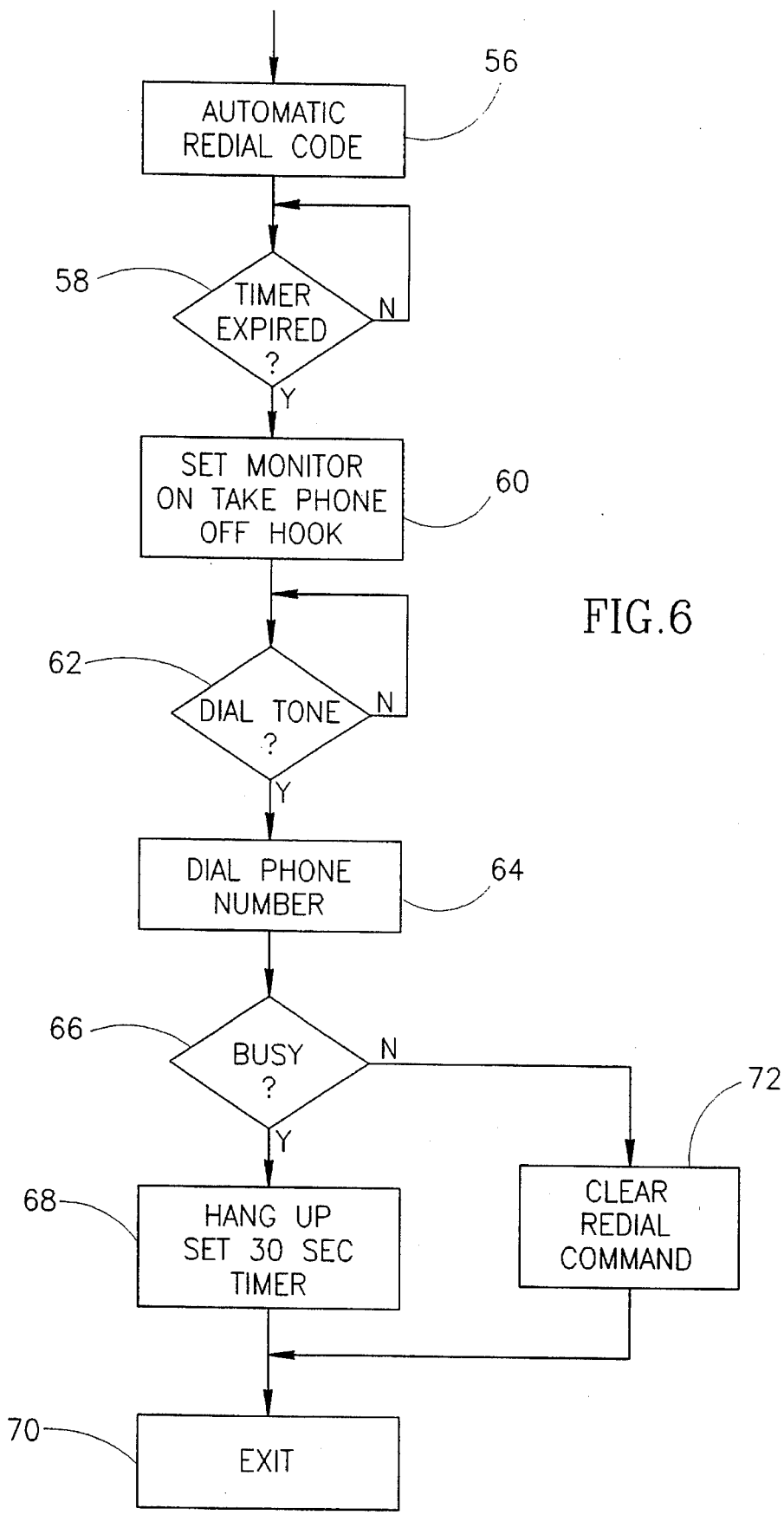

Referring now to FIGS. 5–6, there are shown flowcharts of the functional blocks describing the operational sequence of adaptor device 12. When power is first turned on, microcontroller 34 initializes itself in block 50. In block 52, microcontroller 34 then reads scan codes on keyboard bus 18 between keyboard 20 and computer I/O port 14, looking for a unique scan code dedicated to adaptor device 12, and loops around itself when such a code is not detected.

Since all operations begin within the software loaded in computer 16, adaptor device 12 first looks only for commands being sent from computer 16 to keyboard 20. It identifies these commands by monitoring data and clock lines 30 and 32. Computer 20 generates transmissions when computer I/O port 14 lowers clock line 32 for a minimum of 60 microseconds, and then lowers data line 30 for a start bit. All computer generated transmissions begin with this 60 microcsecond lowering of clock line 32.

Adaptor device 12 then recognizes that this is a transmission intended for keyboard 20 or itself and microcontroller 34 reads the scan code. The scan code contains valid data as long as the clock pulse is high. The clock pulse is generated by keyboard 20. The transmission consists of an 11 bit data word in the following sequence: Start Bit (logic zero), 8 data bits with Least significant bit first, a Parity bit (even parity), followed by Stop Bit (logic one).

Prior to clocking in the Stop Bit, keyboard 20 will clamp the data line 30 low. Computer I/O port 14 will recognize that keyboard 20 has clamped the Stop Bit to zero prior to it being clocked. This serves as an acknowledge to computer I/O port 14 that the data has been received by keyboard 20.

When adaptor device 12 identifies a scan code is directed to a telephone function, in block 54, microcontroller 34 initiates the telephone function, which may be one of the following:

1. Pick up the phone (Go off-hook)
2. Hang up the phone (Go on-hook)
3. Dial a number in tone or pulse mode
4. Set phone to mute
5. Take phone off mute
6. Pause for a second in dialing
7. Start or stop automatic redial In addition to these functions, adaptor device 12 can perform an Automatic Redial function, as shown in the flowchart of FIG. 6. Upon recognition of Automatic Redial code in block 56, microcontroller 34 will begin the Automatic Redial routine by waiting for the expiration of a timer period in block 58, so that it does not constantly redial.

After the timer period has expired, microcontroller 34 will take the phone off-hook, and where a loudspeaker or monitor is provided in the telephone, it will turn the speaker on in block 60. In block 62 a check is made to see if a dial tone is obtained. If not, microcontroller will wait for a dial tone, and will then dial the phone number in block 64. After completing the dial sequence, it then checks in block 66 to see if the dialed number is busy. If so, it hangs up the phone, resets a 30-second timer in block 68 and leaves the routine in block 70, until the 30-second timer again expires. If the line is not busy, microcontroller 34 clears the automatic redial command in block 72, as the desired phone number has been connected.

Having described the invention with regard to certain specific embodiments thereof, it is to be understood that the description is not meant as a limitation, as further modifications will now suggest themselves to those skilled in the art, and it is intended to cover such modifications as fall within the scope of the appended claims.

We claim:

1. A universal wedge-type telephone adaptor device for terminating a telephone line and connecting a telephone handset/headset thereto under control of a computer system having a standard keyboard including a keyboard controller, and a computer, said device comprising:

a telephone controller means comprising a scan code interpreter, located external to and separate from the standard keyboard and computer, said telephone controller means being coupled to the telephone line and the telephone handset/headset and being coupled, by a wedge-type connection, to a keyboard bus connecting the controller of the standard keyboard and computer, said telephone controller means being responsive to unique, dedicated scan codes not otherwise recognized by the controller of the standard keyboard, said unique, dedicated scan codes being generated by the computer and transmitted on said keyboard bus as commands to be identified and interpreted by said scan code interpreter of said telephone controller means for controlling the interconnection of the telephone line and telephone handset/headset.

2. The device of claim 1 wherein said scan code interpreter is responsive to said scan codes for producing telephone operational control signals and wherein said telephone controller means further comprises interface means, coupled to said scan code interpreter and being responsive to said telephone operational control signals to perform an operational dialing sequence on the telephone line.

3. The device of claim 2 wherein said interface means comprises:

a tone generator, responsive to said telephone operational control signals for providing said operational dialing sequence as a tone dialing sequence;

a telephone circuit, coupled to the telephone line, the telephone handset/headset and said tone generator and being responsive to said telephone operational control signals for providing a mute function; and relay means coupled to said telephone circuit and being responsive to said telephone operational control signals, for controlling the interconnection of the telephone line and said telephone circuit.

4. The device of claim 2 wherein said scan code interpreter means is provided by a microcontroller.

5. The device of claim 2 wherein said interface means includes electro-optical isolation circuitry, coupled to said scan code interpreter means and said telephone circuit, for converting said telephone operational control signals to optical signals and reconverting said optical signals to isolated telephone operational control signals.

6. The device of claim 2 wherein said interface means includes isolation transformers providing isolation between said operational telephone control signal and said telephone circuit.

7. The device of claim 2 wherein said interface means comprises:

a telephone circuit, coupled to the telephone line and the telephone handset/headset;

a latch relay, coupled to said scan code interpreter means, for receiving said telephone operational control signals; and a relay circuit, comprising relay contacts interposed in the telephone line for alternately connecting or disconnecting the telephone line to and from said telephone circuit in response to operation of said latch relay, said latch relay providing electrical isolation between the telephone line and said telephone operational control signals.

8. The device of claim 1 wherein said scan codes are generated by a software application program in the computer.

9. The device of claim 1 wherein the keyboard comprises a numeric keypad and the computer generates a scan code for converting said numeric keypad to a telephone dialer, for controlling a telephone dialing function.

10. The device of claim 1 further comprising means for connecting said telephone controller means to the telephone line, the telephone handset/headset and said keyboard bus via connections external to the keyboard and computer.

11. A method for controlling connection of a telephone line and a telephone handset/headset under control of a computer system having a standard keyboard including a keyboard controller, and a computer, said method comprising the steps of:

providing a telephone controller means comprising a scan code interpreter, located external to and separate from the standard keyboard and computer, said telephone controller means being coupled to the telephone line and the telephone handset/headset and being coupled, by a wedge-type connection, to a keyboard bus connecting the controller of the standard keyboard and computer; and responding via said telephone controller means to unique, dedicated scan codes not otherwise recognized by the controller of the standard keyboard, said unique, dedicated scan codes being generated by the computer and transmitted on said keyboard bus as commands to be identified and interpreted by said scan code interpreter of said telephone controller means for controlling the interconnection of the telephone line and telephone handset/headset.

12. The method of claim 11 wherein said telephone controller means responds to said scan codes for producing a telephone operational control signal and performing in accordance therewith an operational dialing sequence on the telephone line.

13. The method of claim 12 wherein said telephone controller means performs said operational dialing sequence in at least one of tone and pulse modes.

14. The method of claim 2 wherein during said operational dialing sequence, said telephone handset/headset is set to mute.

15. The method of claim 12 wherein said telephone controller means pauses for a predetermined interval during said operational dialing sequence.

16. The method of claim 12 wherein said operational dialing sequence is automatically performed in repeated fashion if not successfully completed.

17. The method of claim 12 further comprising the step of isolating said telephone controller means from said telephone line by converting said telephone operational control signals to optical signals and reconverting said optical signals to electrical signals to produce said operational dialing sequence.

18. The method of claim 11 wherein said scan codes are generated by a software application program in the computer.

19. The method of claim 11 further comprising the step of generating a scan code in the computer for converting a numeric keypad on the keyboard to a telephone dialer, for controlling a telephone dialing function.

20. The method of claim 11 wherein said telephone controller means is connected to the telephone line, the telephone handset/headset and said keyboard bus via connections external to the keyboard and computer.

* * * * *